Patented June 14, 1927.

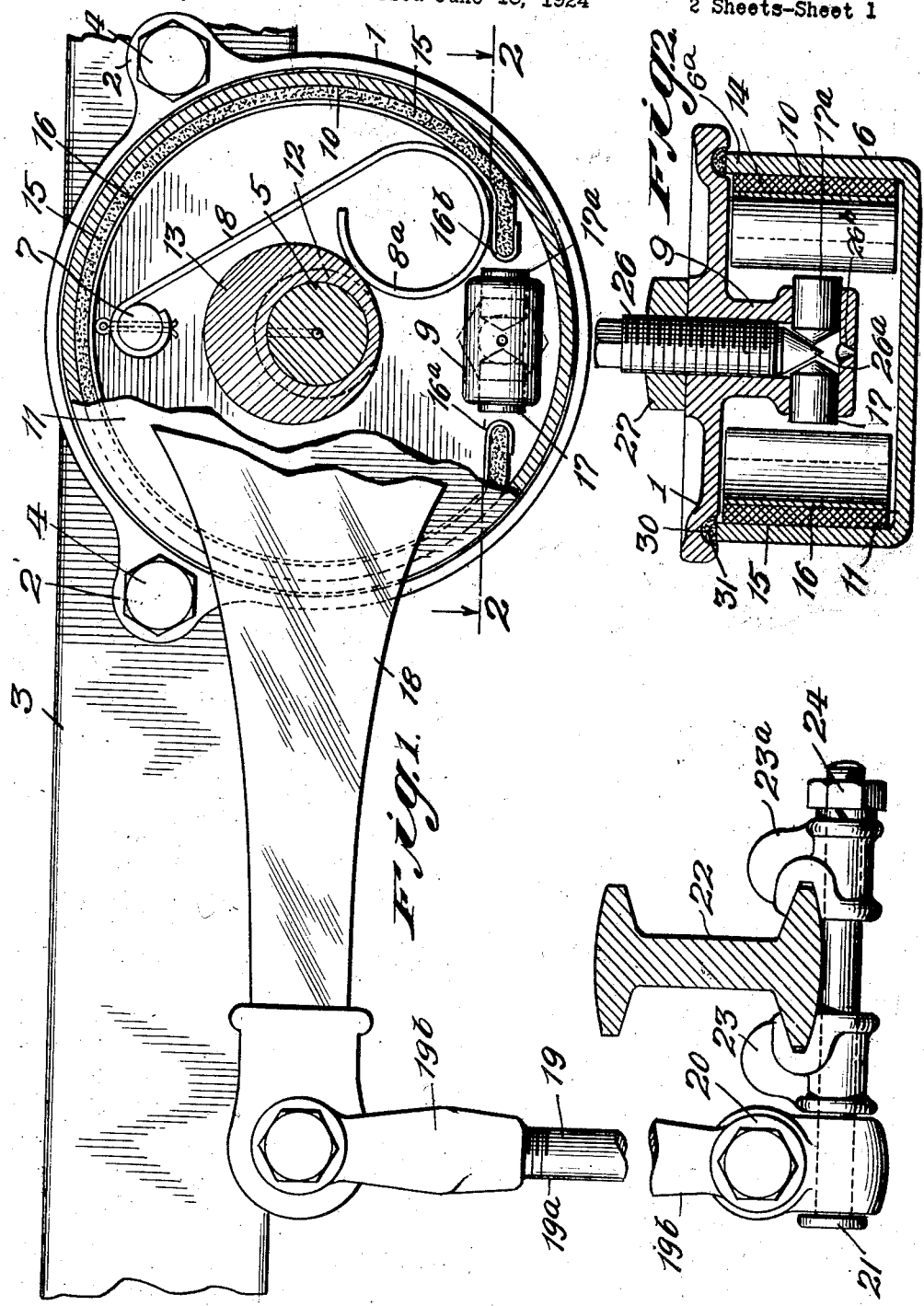

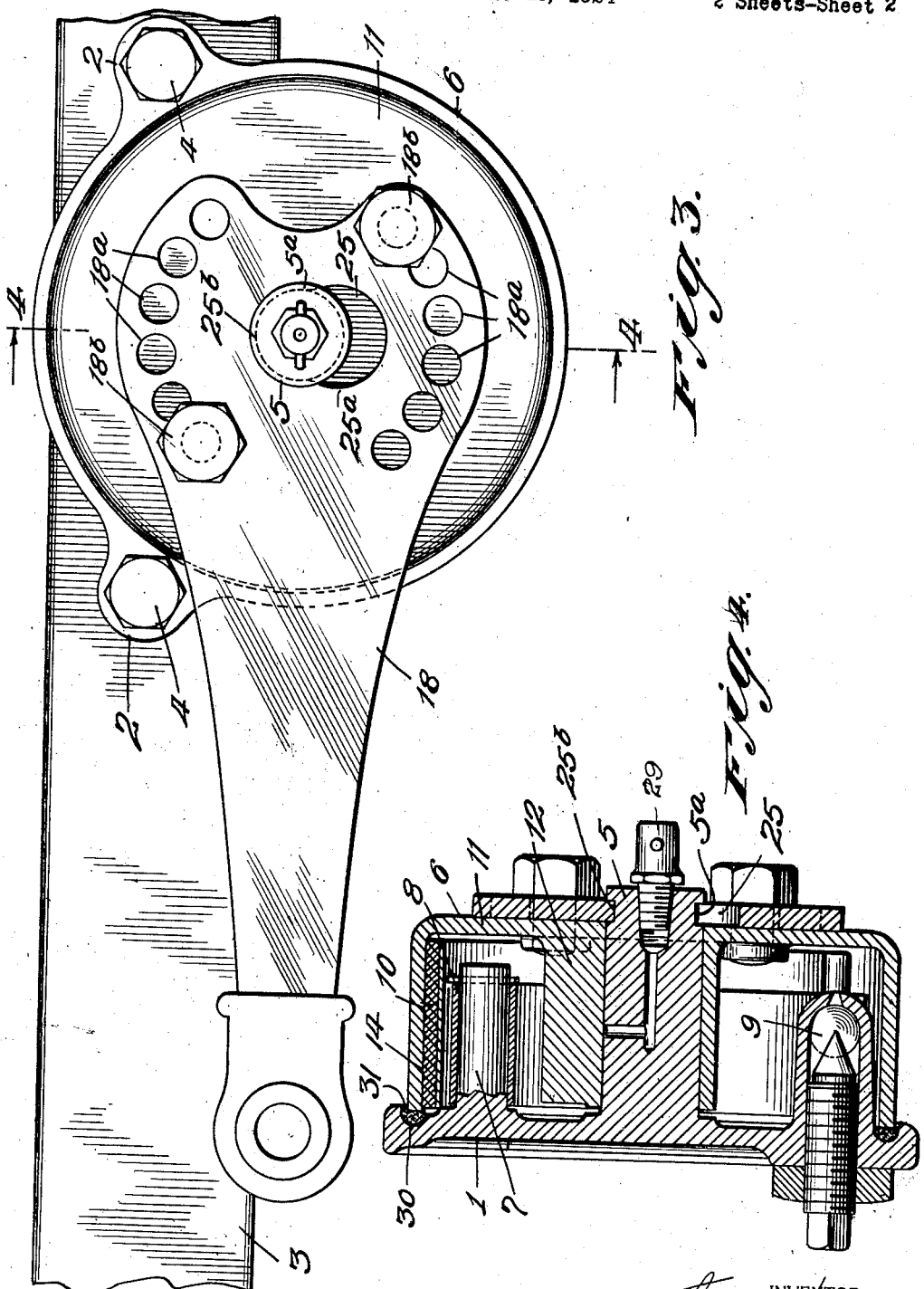

1,632,257

UNITED STATES PATENT OFFICE.

THOMAS F. WILLIAMS, OF FAIRHAVEN, NEW JERSEY, ASSIGNOR TO INGLIS M. UPPERCU, OF DEAL, NEW JERSEY.

SPRING GOVERNOR.

Application filed June 18, 1924. Serial No. 720,754.

This invention relates to an apparatus for modifying and governing the action or reaction of the springs of a vehicle, when the normal distance between the frame of the vehicle and the running gears thereof is changed due to the compression and expansion of the springs when the vehicle is passing over rough or uneven roads.

It is the object of the invention to provide a spring governor or shock absorber which will modify the spring action on both the compression and recoil of the spring and which will vary the amount of modifying action in accordance with variations in the degree of compression or rebound.

Another object of the invention is to provide a spring governor or shock absorber which will act with greater force on the recoil movement of the spring than on the compression movement and which will offer a smooth and gradual check to the violent rebound which many vehicles have from the compression of the springs thereof.

Another object of the invention is to provide a spring governor or shock absorber which will not modify or snub the slight compressions and recoils of the vehicle springs but will leave the vehicle free to move relative to the running gear under the normal action of the springs when the vehicle encounters only slight irregularities in the road surface.

Another object of the invention is to provide a spring governor or shock absorber which will automatically adjust itself to differences in the weight of the load carried by the vehicle.

Another object of the invention is to provide a spring governor which may be easily applied to the various vehicles and which may easily be adjusted to vehicles with different spring reactions.

Various other objects of the invention relating to the simplicity of my spring governor from a manufacturing and assembling standpoint and other features will appear as the description of the invention proceeds.

Referring now to the drawings which illustrate a preferred form of embodiment of the invention.

Figure 1 is a side view of my spring governor with parts broken away to show the interior construction of the same.

Figure 2 is a sectional view on the line 2—2 of Figure 1.

Figure 3 is a side view of the complete spring governor.

Figure 4 is a sectional view on the line 4—4 of Figure 3.

In the form of embodiment illustrated the spring governor includes a circular supporting plate 1 provided with perforated lugs 2 whereby the governor may be secured to the frame 3 of the vehicle by means of the bolts 4. An axle 5 projects outward from the center of the plate 1 for rotatably supporting the hub 12 of the brake drum 6, and a stud shaft 7 projects from near the top of the plate 1 to support the leaf spring 8. A projection 9 near the bottom of the plate 1 supports the means for adjusting the spring governor to be described later. The brake drum 6 is a cup shaped casing provided with the brake band contacting surface 10, the end closing portion 11 and the hub portion 12 which is shaped so that when the drum is bored to fit upon the axle 5 the hub portion forms a cam surface 13 which moves the spring 8 during the operation of the shock absorber.

A substantially circular brake band 14, comprising the friction material 15 and the steel supporting shoe 16 secured to the ends of the friction material by turning the shoe over the ends of the friction material at 16$^a$ and 16$^b$ is located inside the brake drum in position to have a braking action there against when the brake drum moves a certain distance relative to the plate 1. The limit of the distance through which the drum can be moved before any braking action takes place is determined by the distance between the ends of the brake band 14 and the stop members 17 and 17$^a$ which are located in the projection 9 on the plate 1, the ends 16$^a$ and 16$^b$ of the steel supporting shoe being turned inward as illustrated in Figures 1 and 2 so that they are in line with the adjustable stops 17 and 17$^a$ in the projection 9.

In order to move the brake drum when the body of the vehicle moves relative to the running gears, a lever 18 is secured to the end closing portion 11 of the brake drum 6 and the outer end of this lever is pivoted to a link 19 which at its other end is pivoted by means of a universal connection 20 to a bolt 21 secured to the axle 22 of the vehicle. Clamping member 23 fixed on the bolt 21 and clamping member 23ª slidable on the bolt provide a ready means for securing the bolt to the axle under the influence of the nut 24.

For holding the drum 6 on the axle 5, a shallow channel 5ª is made near the end of the axle, and the lever 18 is provided with a keyhole slot 25 the large portion 25ª of which is adapted to pass over the end of the axle 5 while the smaller portion 25ᵇ is adapted to fit into the channel 5ª to lock the drum to the plate 1.

To adjust the operation of the governor to vehicles having different amounts of space between the frame and the running gears, the link 19 is provided with a turn buckle rod 19ª screw threaded at each end into the connection member 19ᵇ so the length of the link may be increased or decreased at will by turning the section 19ª relative to the ends 19ᵇ to be adjusted relative to the drum 6 in order to vary the braking action of the spring governor the lever is provided with an accurate series of holes 18ª at each side of the key hole slot 25 through which the bolts 18ᵇ may be inserted. It is to be understood that through the agency of the link 19 the arm 18 is held substantially horizontal in the normal position of the springs so that when the bolts 18ᵇ are in the first of the holes 18ª the position of the cam surface 13 on the hub of the drum 6 is substantially as illustrated in Figure 1 and the lowest braking or snubbing action is had, however, when the bolts 18ᵇ are in the third or fourth of the holes 18ª the cam surface 13 will be turned to the right from the position of Figure 1 when the arm 18 is horizontal, and will bear more heavily on the spring 8 to increase the braking action of the band 14 on the drum surface 10 when the drum 6 is rotated relative to the plate 6. By the means just described it is possible not only to adjust the braking action for cars of different weight, but to adjust the shock absorbers to give different braking on the rear spring than on the front.

In the operation of the spring governor, when the wheels strike a hole or bump in the road the springs are compressed and the body of the vehicle moves downward relative to the running gear. This has the effect, through the link 19 of elevating the lever 18 and turning the drum 6 and cam surface 3 in a clockwise direction. During the first part of this movement the brake band 14 which is free or floating in the drum 6 rotates with the drum and there is no braking or snubbing effect, so that for slight compression and recoil of the springs there is no snubbing effect and the vehicle is free to absorb the slight bumps and irregularities in the road surface by the natural spring reaction. This range of free movement is determined by the distance between the ends 16ª and 16ᵇ of the brake band and the stops 17 and 17ª, and may be adjusted by means of the screw 26, which passes through the plate 1 and is provided with a conical end 26ª contacting with the conical ends of the stops 17 and 17ª to determine the distance the stops will project from the casing 9. The bottom portion of projection 9 may be provided with a small conical hole 26ᵇ to accommodate the conical end 26ª of the screw 26, in order that the said conical end 26ª may be effective throughout its length to vary the positions of stops 17 and 17ª. The projecting end of screw 26 is squared to permit ready adjustment of the screw and a locknut 27 is provided to hold the screw in adjusted position.

When, however, the movement of the drum is greater than the distance between the end of the brake band 14 and the stop 17ª so that further rotation of the band will be prevented and the drum 6 will slide relative to the suction lining 15 to exert a braking or checking action on the compression of the spring. However, as the end 16ª of the brake band is free, there is no tendency to expand the brake band and the braking action results only from the slipping between the band and drum due to the resiliency of the supporting shoe 16, and is relatively slight.

During the compression movement of the spring, however, the cam surface 13 is rotated in a clockwise direction to increase the pressure on the loop 8ª of the spring 8, which in turn presses the brake band 14 firmly against the surface of the brake drum 6 with a gradually increasing pressure so that the further the drum is rotated the greater braking action is exerted through the cam 13. When the downward movement of the chassis is ended and the spring starts to recoil the band 14 will be positively gripped near the end 16ᵇ and when the end 16ª contacts with the stop 17 the counterclockwise rotation of the drum 6 will expand the band 14 into firm contact with the drum at all points so as to exert a high braking action and quickly, yet smoothly check the rebound.

The axle 5 is provided with a passage 28 to the interior of the hub 12, and a suitable grease cup 29 in the end of the axle 5 permits easy lubrication of the spring governor.

To prevent dust and moisture from reaching the interior of the governor, the plate 1 is provided with a groove 30 which the edge 6ª of the drum 6 extends, and this groove is packed with a suitable material 31 to keep out the dust.

While I have indicated and described the preferred embodiment of my invention it is to be understood that various modifications and changes can be made therefrom, without departing from the spirit of the invention or the scope of the appended claims.

What I claim is:

1. A spring governor comprising a drum, a pivotal mounting therefor, a brake member located within and engaging the inner surface of said drum, an abutment member receiving the ends of the brake member thereagainst, and means actuated by the relative movement of said brake member and drum for effecting a local pressure of said member against said drum.

2. A spring governor for spring-connected relatively movable parts, a support carried by one of said parts, a drum pivotally mounted upon said support, means for connecting said drum to the other of said relatively movable parts, a brake band engaging said drum, with the two ends of said brake band adjacent fixed abutments, and means actuated by the relative movement of said brake band and drum for effecting a local pressure of said member against said drum.

3. A spring governor for spring-connected relatively movable parts, a support carried by one of said parts, a drum pivotally mounted upon said support, means for connecting said drum to the other of said relatively movable parts, a brake band engaging said drum, with the two ends of said brake band adjacent fixed abutments, and means for producing a local pressure between the said drum and brake band adjacent one end of the latter and with the said local pressure proportional to the angular displacement of the drum from its normal position.

4. An apparatus for governing the relative motion of two spring-connected parts comprising a drum pivotally connected at its center to one of said parts and eccentrically connected to the other of said parts, a brake engaging said drum and adapted to frictionally resist the motion thereof, and means for varying the frictional resistance to motion of the drum proportioned to the angular displacement of the drum from its normal position.

5. An apparatus for governing the relative motion of two spring-connected parts comprising a drum pivotally connected at its center to one of said parts and eccentrically connected to the other of said parts, a brake engaging said drum and adapted to frictionally resist the motion thereof, means for varying the frictional resistance to motion of the drum proportioned to the angular displacement of the drum from its normal position, and means for exerting a local pressure upon said brake adjacent the one end thereof so as to unequally resist opposite motions of said drum.

6. An apparatus of the class described for governing the relative motions of two spring-connected parts, comprising a supporting plate adapted to be secured to one of said members, a drum pivotally mounted thereon, means for connecting said drum to the other of said parts so as to rotate the drum upon the relative movement of the two spring-connected parts, a brake band located within and engaging the inner surface of said drum, adjustable stop means adjacent the ends of the brake band, receiving ends of the brake band there against and means actuated by the relative movement of said brake band and drum for effecting the local pressure of said band against said drum.

7. An apparatus of the class described for governing the relative motions of two spring-connected parts, comprising a supporting plate adapted to be secured to one of said members, a drum pivotally mounted thereon, means for connecting said drum to the other of said parts so as to rotate the drum upon the relative movement of the two spring-connected parts, a floating brake band located within and engaging the inner surface of said drum, stop means adjacent the ends of the brake band, means for exerting a local pressure upon said brake band and forcing it against said drum near the one end of said brake band, and means for varying the said local pressure proportional to the angular displacement of the drum from its normal position.

8. A spring governor comprising an attaching plate, a drum pivotally mounted thereon, means associated with said drum for connecting it to the axle of a vehicle, a brake band located within and frictionally engaging the said drum, an abutment member adjacent the ends of the brake band, means for adjusting the said abutment members to vary the distance between same and the ends of the band, resilient means engaging the brake band adjacent one end thereof and adapted to force the said brake band end against the said drum, and a cam shape member carried by said drum adjacent the pivotal mounting thereof and cooperating with said resilient means and adapted to vary the local pressure of the brake band end against the drum proportional to the angular displacement of the drum from its normal position.

9. In a shock absorber of the type described, the combination of a support, a brake drum pivoted thereon, a brake band contacting with said drum and movable therewith, means to move the drum relative to said band to cause a braking action and means to increase the pressure between the band and the drum in proportion to the amount of rotation, to vary the braking action.

10. In a shock absorber, a support, a circular brake drum pivoted thereon, a substantially circular brake band inside the drum, means to rotate the drum, means to prevent rotation of the band to cause slipping between the band and drum and means to increase the pressure between the band and the drum near one end of the band, as the drum rotates in one direction so as to increase the braking action between the drum and band when the drum rotates in the other direction.

11. In a shock absorber of the type described, a support, a circular brake drum pivoted on said support, a substantially circular brake band inside the brake drum, a spring shoe for pressing the brake band against the drum, means to turn the drum on its pivot to cause relative movement between the drum and band, and cam means on the drum hub for increasing the friction between one end of the band and the drum so as to cause a greater braking action when the drum is rotated in one direction than in the other.

12. A spring governor comprising a support, a drum, pivotally mounted thereon, a brake member floating interior of the drum, acting there against, and movable therewith, said drum and band being arranged for a limited free movement together, relative to said support, means for limiting the movement of said brake member and means for binding said brake member against said drum upon further movement of said drum, and means for increasing said binding action in proportion to further relative movement of said drum and said brake member.

13. In a shock absorber, a support, a brake drum pivoted thereon, a brake band acting upon said drum, and movable therewith, means to prevent rotation of said band to cause slipping between the band and drum means, comprising a cam attached to said drum, for increasing the pressure between the band and the drum, in proportion to the amount of rotation to vary the braking action of the latter and means to vary the initial pressure between said band and drum.

14. In a shock absorber, a support, a brake drum pivoted thereon, a brake band acting upon said drum, and movable therewith, means to prevent rotation of said band to cause slipping between the band and drum, means comprising a cam attached to said drum for increasing the pressure between the band and the drum in proportion to the amount of rotation to vary the braking action of the latter and means to vary the initial pressure between said band and drum, and said means last named comprising a brake arm attached to said drum and means for adjusting the relative positions of said drum and said arm.

In testimony whereof I have affixed my signature to this specification.

THOMAS F. WILLIAMS.